US009491237B1

(12) United States Patent
Garg et al.

(10) Patent No.: US 9,491,237 B1
(45) Date of Patent: Nov. 8, 2016

(54) PROXIMITY BASED SHARING (71) Applicant: Amazon Technologies, Inc., Reno, NV (US)

(72) Inventors: Sunil Kumar Garg, Seattle, WA (US); David George Butler, San Jose, CA (US); Vijay Rangarajan, Seattle, WA (US); Arvind Thiagarajan, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 14/195,398

(22) Filed: Mar. 3, 2014

(51) Int. Cl.
*H04L 29/08* (2006.01)
*H04W 4/02* (2009.01)
*H04L 12/18* (2006.01)

(52) U.S. Cl.
CPC .......... *H04L 67/1046* (2013.01); *H04W 4/021* (2013.01); *H04L 12/1818* (2013.01)

(58) Field of Classification Search
CPC . H04L 67/104; H04L 12/1818; H04W 4/021
See application file for complete search history.

(56) References Cited

U.S. PATENT DOCUMENTS

| 8,964,947 | B1* | 2/2015 | Noolu | H04M 3/541 379/88.01 |
| 8,972,496 | B2* | 3/2015 | Bezos | H04L 67/06 709/204 |
| 2004/0236850 | A1* | 11/2004 | Krumm | H04L 29/06 709/224 |
| 2005/0113123 | A1* | 5/2005 | Torvinen | H04W 4/021 455/519 |
| 2009/0161592 | A1* | 6/2009 | So | H04W 76/02 370/312 |
| 2010/0146115 | A1* | 6/2010 | Bezos | H04L 67/06 709/225 |
| 2010/0274859 | A1* | 10/2010 | Bucuk | H04L 63/08 709/206 |
| 2012/0315846 | A1* | 12/2012 | Gartner | H04B 5/0031 455/41.1 |
| 2012/0319825 | A1* | 12/2012 | Shimy | H04L 12/2818 340/12.5 |
| 2014/0173690 | A1* | 6/2014 | Ekberg | H04L 63/08 726/3 |

* cited by examiner

*Primary Examiner* — Joe Chacko
(74) *Attorney, Agent, or Firm* — Seyfarth Shaw LLP; Ilan N. Barzilay; Joseph M. Walker (57) ABSTRACT

A system and method for sharing content with a group of devices based on proximity. A sharing device transmits an SSID and an audio signal containing a key. The audio signal may be controlled to limit the area in which the audio signal may be received or heard by a receiving device. For example, the audio signal may be controlled to limit receipt to a device at a same table (a few feet away from the first device), in a same room, etc. This allows the sharer to selectively share content with one or more receiving devices without sharing with all devices in proximity to the first device.

18 Claims, 10 Drawing Sheets

PROXIMITY BASED SHARING

BACKGROUND

Certain wireless communications protocols, such as Wi-Fi and/or Wi-Fi direct, may have mechanisms for handshaking that use beacons that are transmitted by a wireless access point, base station, wireless router, and/or other electronic devices acting as a wireless router. These beacon signals are typically used by users in proximity of the wireless access point, base station, wireless router, and/or other electronic devices acting as a wireless router.

BRIEF DESCRIPTION OF DRAWINGS

For a more complete understanding of the present disclosure, reference is now made to the following description taken in conjunction with the accompanying drawings.

DETAILED DESCRIPTION

Aspects of the present disclosure include devices, systems and methods for wirelessly sharing content from one device to one or more other devices based on a proximity of the devices. The devices may be one or more of a computing device, a laptop computer, a cellular phone, a personal digital assistant (PDA), a tablet computer, a wearable device, other mobile device, etc. The proximity control may be based on an ability of a device to receive a localized transmitted signal, such as a radio frequency (RF) signal, an audio signal, an infrared (IR) signal, or some combination of one or more of these techniques.

In one aspect, a group owner device or transmitting device may share content by announcing the availability of a proximity-based group, that is a group of devices within a certain proximity to each other or to the group owner. The announcement may occur via a service set identification (SSID) broadcast, a Bluetooth access point, or other networking technology. In general, the group owner device generates a SSID that may point to a URL or a local wireless network broadcast by the group owner device. Other devices or receiving devices in the area that are Wi-Fi enabled may receive the SSID and connect to the group. In some aspects, the SSID may contain an internet protocol (IP) address or a uniform resource locator (URL). When a receiving device receives the SSID, the receiving device may then connect either to the local wireless network or the URL related to the SSID. The URL may not be a complete URL, but may contain enough information to make it unique and tell the receiving device where to go to access the proximity-based group.

Traditional networking techniques generally use a broadcast technique and require the user or sharer to manually limit who the user wants to share with. As disclosed herein, the proximity based signals are used to control who can access the sharing group. To control the proximity or access, while the SSID is being broadcast, a key may be transmitted via an audio transmission using audio frequency at a low volume, ultrasonic frequency and/or other audio within or outside the range of human detection (generally outside the range of approximately 20~20,000 Hz). The key may be a wireless protected association (WPA) pre-shared key, such as a 64-bit key or 128-bit key, that allows the receiving device to connect to the group. While the SSID broadcast using Wi-Fi may penetrate walls, the audio signal containing the key may be unable to penetrate walls, and may attenuate more strongly as it travels through the atmosphere as compared to the Wi-Fi signal. Thus, the audio signal may be controlled to limit the recipients of the key to those located within a certain physical space. Once a device joins a group it may gain access to documents, files, data or other materials that are private to the group. These materials may be pulled by each device in the group as desired or may be pushed to each device in the group, for example by populating a group folder on each device upon its entry into the group. Depending on group configurations, other factors beyond proximity may also determine what devices are permitted entry into the group.

In an aspect, the audio signal may be replaced by a non-audio signal, for example, an extremely high frequency (i.e. 30-300 gigahertz), such as a 60 gigahertz frequency. Such a signal may also be constrained by physical structures in the area. For example, a 60 gigahertz frequency may be attenuated by or unable to penetrate o physical barriers, and/or be subject to atmospheric attenuation due to the nature of the high frequency. It should be appreciated that other types of frequencies may also be used.

The following description provides exemplary implementations of the disclosure. Persons having ordinary skill in the field of computers, audio, and multimedia technology will recognize components and process steps described herein that may be interchangeable with other components or steps, or combinations of components or steps, and still achieve the benefits and advantages of the present disclosure. Moreover, in the following description, numerous specific details are set forth in order to provide a thorough understanding of the disclosure. It will be apparent to one skilled in the art, however, that the disclosure may be practiced without some or all of these specific details. In other instances, well-known process steps have not been described in detail in order not to unnecessarily obscure the disclosure.

Figure 1:
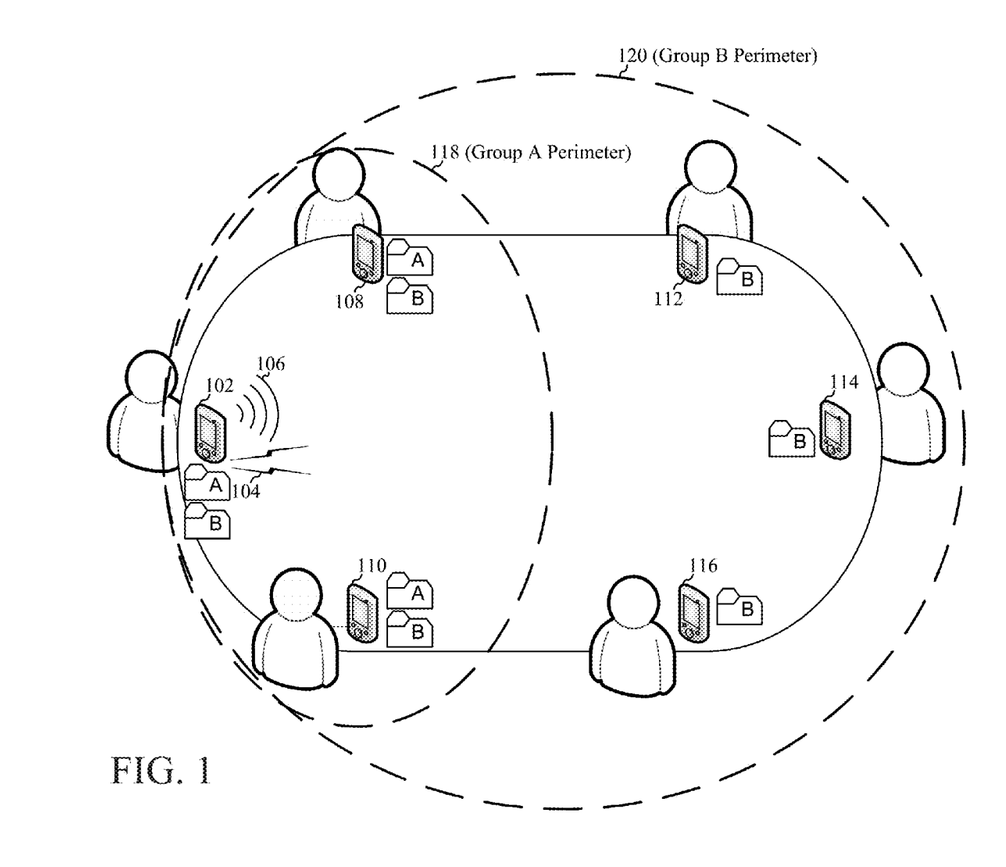
FIG. 1 illustrates a system overview according to an aspect of the disclosure.

FIG. 1 illustrates a system overview according to an aspect of the disclosure. A transmitting device or first device 102 announces the availability of a sharing group via a wireless transmission, for example, a radio frequency (RF), Wi-Fi network, or other wireless transmission. The first device 102 may be a group leader that initiates the sharing group and manages the sharing group, including the devices allowed to access the sharing group.

In an aspect, the first device 102 transmits a beacon signal. The beacon signal may, in certain examples, be a beacon signal associated with an established communications protocol, such as Wi-Fi, Bluetooth, and/or Wi-Fi direct. In an aspect, the beacon signal is a Wi-Fi SSID beacon signal 104. The first device 102 also transmits an audio transmission 106 using audio frequency. In an aspect, the audio transmission 106 includes a WPA key.

One or more receiving devices or second devices, such as second devices 108-116, receive the SSID signal 104. These receiving devices may receive the SSID signal as part of their normal Wi-Fi scan operation. The transmit power range of the SSID signal 104 may be controlled to limit a group proximity range and thereby proximity of the receiving devices that can receive the SSID signal 104. Additionally, in order to access the sharing group, the receiving devices require the WPA key. As described above, the WPA key is included in the audio transmission 106. Thus, the receiving devices capable of receiving or hearing the audio transmission 106 can access the sharing group. The audio signal may be controlled by the first device 102 to limit the recipients of the key to those located within a certain physical space. The first device 102 may also selectively choose or limit the individual second devices 108-116 that may join the group.

For example, the first device 102 may desire to share a document, such as a presentation, with others in the room. The first device 102 may then launch a sharing application and see all the devices, such as second devices 108-116, in the room. The first device 102 may then control the audio transmission 106 to share group A content with a select few devices, such as second devices 108 and 110 located within the group proximity range identified by the group A perimeter 118. This may be useful in the situation where the users of the second devices 108 and 110 are co-presenters and the group A content relates to notes for the presentation. The first device 102 may also control the audio transmission 106 to share group B content with all the devices, such as second devices 108-116, located within the group proximity range identified by the group B perimeter 120. Thus, the first device 102 can share information with select co-presenters, while sharing information, such as the presentation with everyone, including the audience, by creating sharing groups and controlling the power of the audio transmission 106.

In some aspects, when the SSID signal 104 is received by the receiving devices, such as second devices 108-116, the receiving devices activate or turn on their microphone to listen for the audio transmission 106. When the audio transmission 106 is received and validated, a response may be sent to the first device 102 with the receiving device's RF-fingerprint and the result from the audio processing. The first device 102 validates the RF-fingerprint for coarse proximity, and the audio sample for in-room/short-range proximity. This audio-based geo-fence provides a factor for proximity authentication. Recipients use the key from the audio transmission 106 to prove to the sharer that they are in proximity to hear the key. This sharing methodology can be used for numbers applications, for example, sharing documents, audio files, video files, playing games, etc.

The RF-fingerprint may be a representation of radio frequency (RF)/wireless signals that are detectable by a device. The RF-fingerprint may include the identity of certain detectable wireless signals, such as signals associated with certain Wi-Fi networks and/or specific transmitters or access points, cellular signals, Bluetooth signals, other RF transmissions, etc. The RF-fingerprint may include associated signal strengths for detected RF signals. RF-fingerprints may change with changes in location, for example as certain wireless signals become undetectable (or lose strength) and others become detectable (or gain strength). Thus a RF-fingerprint taken by a device at a specific location may serve as an identifier of the device's location or proximity.

Location or proximity of a device may also be confirmed and/or controlled by using other techniques, such as a radio frequency (RF) signal, received signal strength indication (RSSI), time of flight of an audio signal, audio pinging/triangulation, an infrared (IR) signal, a Bluetooth signal, or a haptic communication. The time of flight of the audio signal technique generally measures the time it took for the receiving device to hear the audio signal and respond to the sending device or first device. Audio pinging/triangulation includes, for example, devices playing a tone back. Each device may then triangulate an angle of arrival of the tone and determine a range, based on the amplitude of the received signal, and a position of the devices in the group. The IR signal technique generally includes controlling a transmit strength of an IR signal to limit or enlarge the number of surrounding devices that are capable of receiving the IR signal. The haptic communication is generally a tactile communication such as a vibration pattern, etc. Such a haptic communication may be transmitted by a device (such as a vibration emitter) on a physical surface (such as a table top, counter, etc.) upon which a user device may be placed. If the user device is capable of detecting the haptic communication and confirming receipt of the communication to the system, the system then knows that the user device is located on the specific physical surface and may allow the user device to access the sharing group.

Further, although the security code or security key described herein is described as being sent via an audio signal, other signaling methods that may be proximity limited, such as IR signals, haptic signals, etc. may also be used to transmit the security key or other proximity dependent information.

The sharing of content, for example, sharing documents, audio files, video files, playing games, etc., may be done using any number of techniques. For example, the sharing of content may be performed using Wi-Fi, IR, Bluetooth, haptic communication, audio or one or more other techniques capable of transferring content, data, and/or information.

Figure 2:
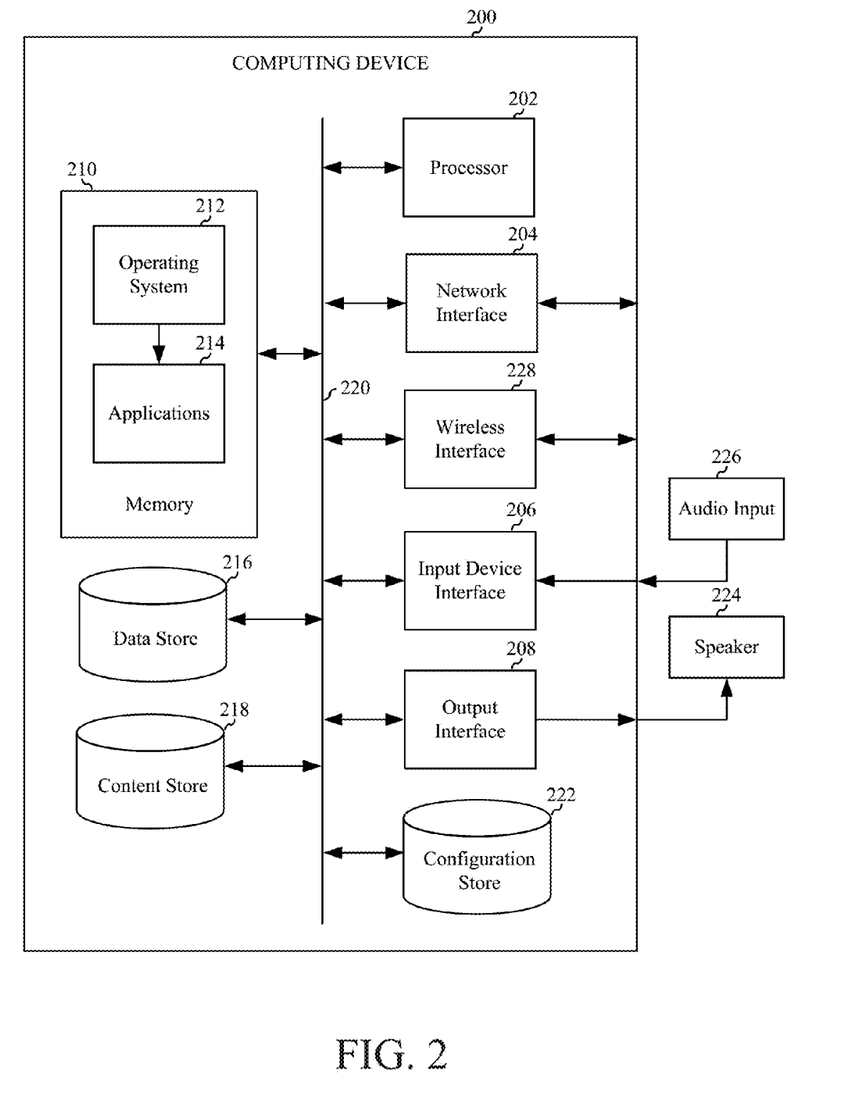
FIG. 2 illustrates a block diagram conceptually illustrating a computing device according to one aspect of the present disclosure.

Aspects of the present disclosure may be implemented as a computer implemented method in a computing device or computer system. These computing devices may include, but are not limited to, mobile phones, laptop computers, tablet computers, personal computers, workstations, mini- and mainframe computers, servers, and the like. These computing devices may also include specially configured computers for processing digital multi-media content. The general architecture of a suitable computing device is described below with reference to FIG. 2. FIG. 2 is a block diagram illustrating exemplary components of a computing device 200 suitable for processing and streaming media content. However, the following description of the exemplary components of a computing device 200 should be viewed as illustrative only and not construed as limiting in any manner. In one aspect, the device 102 or the devices 108-116 shown in FIG. 1 may be implemented as the exemplary computing device 200, for example.

With regard to FIG. 2, the exemplary computing device 200 may include a processor 202 in communication with a variety of other components over a system bus 220 or through a direct connection. These other components may include, by way of example, a network interface 204, a wireless interface 228, an input device interface 206, an output interface 208, and a memory 210. As appreciated by those skilled in the art, the network interface 204 enables the computing device 200 to communicate data, control messages, data requests, and other information with other resources including computers, data sources, storage devices, and the like, on a computer network such as the Internet. The network interface 204 may be configured to communicate via wired or wireless connections. The wireless interface 228 enables the computing device 200 to communicate data, control messages, data requests, and other information with other resources including computers, data sources, storage devices, and the like using wireless communication techniques. Examples of wireless communications include, but are not limited to, RF, infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, and other communication networks of the type.

As one skilled in the art will appreciate, the computing device 200 may obtain content, such as streamed audio, video, and/or game from another computer, a storage device, or other source via the computer network. The computing device 200 may also save the content to a networked location or send it to another computer or satellite on the network, for example.

The input device interface 206, sometimes also embodied as an input/output interface, enables the computing device 200 to obtain data input from a variety of devices including, but not limited to, a microphone, a digital pen, a touch screen, a keyboard, a mouse, a scanner, and the like. In addition to the exemplary components described above, an output interface 208 may be used for outputting information such as audio signals or display information. Audio signals may be output to other user devices, for example. Display information may be output by the output interface 208 via a display device (e.g., a monitor or similar device, not shown), for example. Audio output may also be output by the output interface 208 through an audio device such as a speaker 224, for example. An audio input device 226, such as a microphone, may also input audio to the computing device 200. Of course, while not shown, one skilled in the art will appreciate that one or more speakers 224 and/or audio input devices 226, may be incorporated as integral elements within a computing device 200 or may be separate therefrom.

The processor 202 may be configured to operate in accordance with programming instructions stored in a memory 210. The memory 210 generally comprises RAM, ROM, and/or other memory. Thus, in addition to storage in read/write memory (RAM), programming instructions may also be embodied in read-only format, such as those found in ROM or other permanent memory. The memory 210 may store an operating system 212 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 210 may also store user-executable applications 214, or programs, for conducting various functions on the computing device 200. For example, the application 214 in memory 210 may be configured according to aspects of the present disclosure to control access to content within a certain proximity.

The computing device 200 optionally includes a data store 216, a content store 218, and/or a configuration store 222, depending on how the computing device 200 is to be used. For example, if the computing device 200 is a device 102 shown in FIG. 1 it may include the data store 216, the content store 218 and the configuration store 222. If the computing device 200 is configured to provide the audio transmission shown in FIG. 1, it may include the configuration store 222.

The data store 216 may store location data associated with network availability and signal strength information and may be used to determine the proximity or presence of a user device in relation to the computing device 200 according to aspects of the present disclosure. The content store 218 may be used to store the content that is transmitted and/or received by the computing device 200. The configuration store 222 may be configured to store information and data for use in initiating, terminating, and managing the members and content within a sharing group.

It should also be understood that the following description is presented largely in terms of logic and operations that may be performed by conventional computer components and media components. These computer components, may be grouped in a single location or distributed over a wide area. In circumstances where the computer components are distributed, the components may be accessible to each other via wired and/or wireless communication links, for example.

Figure 3:
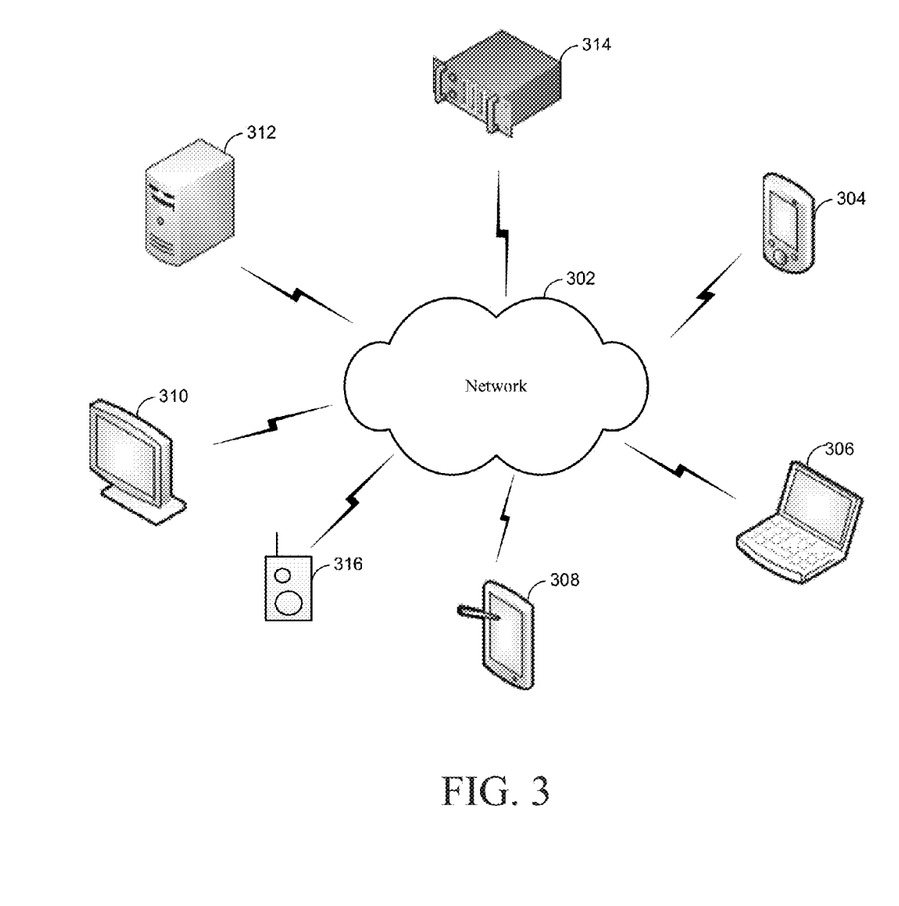
FIG. 3 illustrates a computing network for use with distributed processing according to one aspect of the present disclosure.

As shown in FIG. 3, multiple devices may be connected over a network 302. Network 302 may include a local or private network or may include a wide area network such as the Internet. Devices may be connected to the network 302 through either wired or wireless connections. For example, a wireless device 304 may be connected to the network 302 through a wireless service provider. Other devices, such as laptop 306 or tablet computer 308 may be capable of connection to the network 302 using various connection methods including through a wireless service provider, over a Wi-Fi connection, or the like. Other devices, such as television 310, may connect to the network 302 through a wired or wireless connection. Networked devices may be joined together to form groups as described herein.

In certain system configurations, one or more remote devices in a group may share content. For example, content may be sent over the network 302 to television 310 by wireless device 304. The content may be streamed or transmitted in another fashion. In another aspect, an audio device 316 or stereo may receive content from the wireless device 304.

Figure 4:
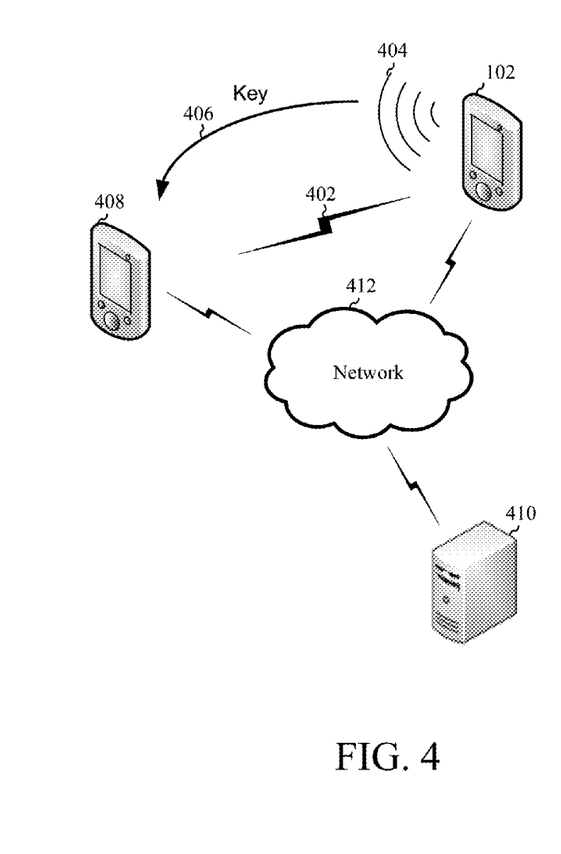
FIG. 4 illustrates a distributed environment according to one aspect of the present disclosure.

One configuration of the present disclosure is shown in FIG. 4. In this configuration, a first device 102 transmits a SSID signal 402 that points to a URL, and an audio signal 404 containing a key 406. A second device 408 receives the SSID signal 402 and the key 406. The second device 408 accesses the URL in the SSID signal 402 and provides the key 406 to a server 410 via a wired or wireless network 412 as a means of authenticating that the second device 408 is in fact in proximity to hear the audio signal 404. The second device 408 may then receive content from the first device 102 directly or from the server 410 through the network 412.

The systems and methods disclosed herein allow for selective sharing of content based on proximity to a sharing device. In general, the sharing relies on a combination of audio and Wi-Fi based technologies for proximity detection and security enforcements. Audio tones, such as those that are outside the human hearing range, are used to limit the sharing to a fixed area. Time of flight for the audio may also be used to calculate the distance from the source. Additionally, these tones may carry a pin for moving the data securely between devices.

As an example, a first user of a first device may desire to share a document, a video, a picture, an audio file, play a game, etc. with another device. The first device transmits an SSID and an audio signal. The audio signal may be controlled to limit the area in which the audio signal may be received or heard. For example, the audio signal may be controlled to limit receipt to a device at a same table (a few feet away from the first device), in a same room, etc. This allows the sharer to selectively share content with one or more other devices without sharing with all the devices near the first device.

In another example, a first user may be playing a game, such as a driving type game, on the first device. The first device may initiate a sharing group and allow a second device to join the game. This may allow the first user and a second user of the second device to share game content, such as allowing the second device to play or drive on the same course or road of the driving game.

Figure 5:
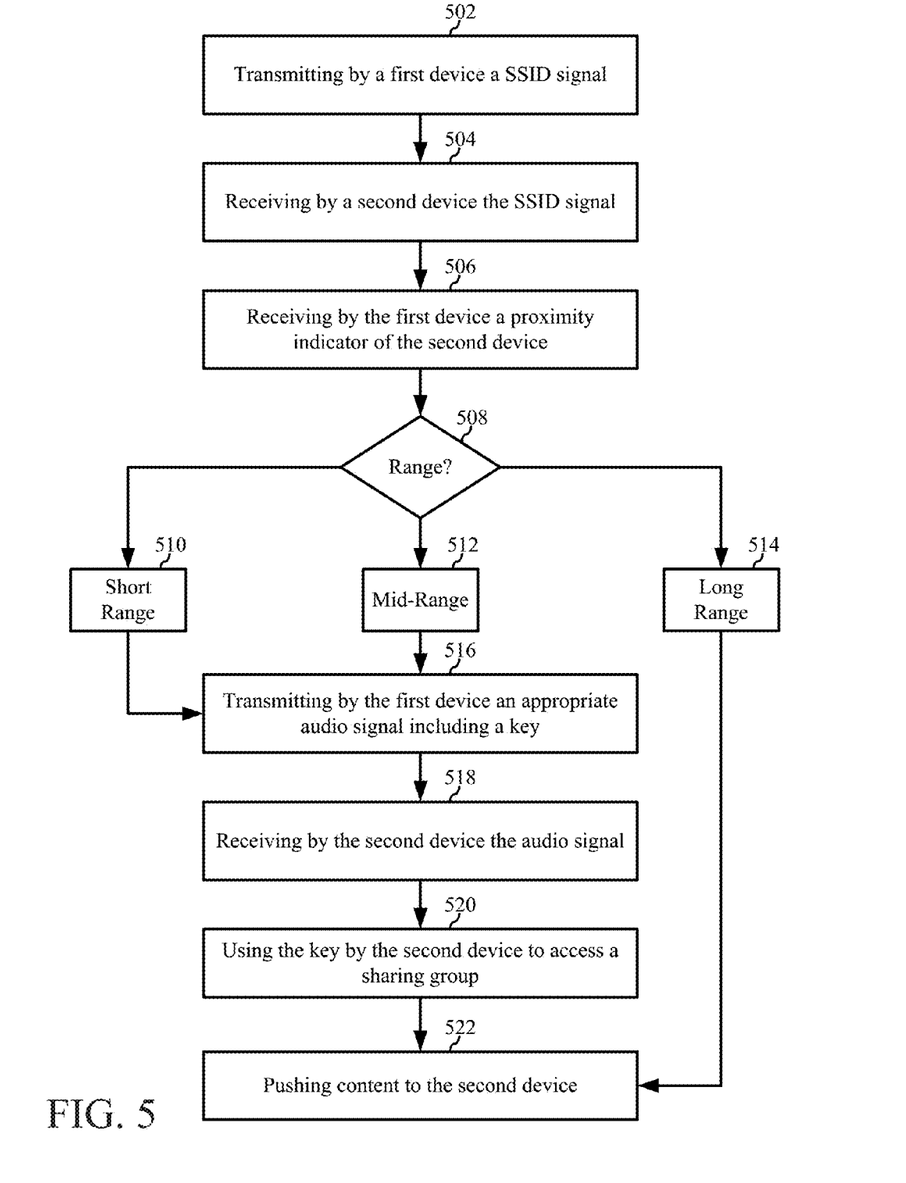
FIG. 5 is a flow diagram illustrating an exemplary routine for forming a group and sharing content based on proximity according to aspects of the present disclosure.

FIG. 5 is a flow diagram illustrating an exemplary method for forming a group and sharing content based on proximity. As an example, one or more of the logical components of FIGS. 1-4 may perform the methods disclosed herein. In block 502, a first device transmits an SSID signal. The SSID signal is received by a second device, illustrated as block 504. The second device then sends, and the first device receives, a proximity indicator, such as a RF-fingerprint or other information relating to proximity, from the second device, illustrated as block 506. In an aspect, the first device may receive a plurality of proximity indicators from a plurality of second devices. The proximity indicators may be used to determine or identify the proximity of the second devices to the first device. In this aspect, a determination may then be made as to the proximity range of a signal containing a key that is to be transmitted by the first device, illustrated as block 508. As described above, the signal may be an audio signal containing the key that allows the second device(s) to connect to the sharing group.

A user of the first device may select the group proximity range of the signal to be transmitted. For example, a short range audio signal (for example, which can only be heard by second devices located about 2 feet from the first device), illustrated as block 510; a mid-range audio signal (for example, which can only be heard by second devices located about 8 feet from the first device), illustrated as block 512; or a long range signal (for example, an RF signal), illustrated as block 514, may be transmitted. This allows the user of the first device to select a desired proximity range within which to share content.

When the short range audio signal or the mid-range audio signal is selected, the first device then transmits the appropriate audio signal, having the appropriate transmission strength, containing the key, illustrated as block 516. The second device(s) listens for and receives the audio signal, illustrated as block 518. When the audio signal is received and validated, a response may be sent to the first device with the receiving device's proximity indicator and the result from the audio processing. The first device may validate the proximity indicator for coarse proximity, and the audio sample for in-room/short-range proximity. The second device(s) may use the key to access the sharing group, illustrated as block 520. Once connected to the sharing group, the first device may then transmit or push content to the second device(s), illustrated as block 522. For example, content may be automatically pushed to the second device(s) in response to the second device(s) connecting to or becoming members of the sharing group.

In other aspects, as described above, the first device may share content directly or content may be shared through a network. Additionally, it should be appreciated that the first device may also receive content from the second device(s) connected to the sharing group.

When the long range signal is selected, the first device may simply transmit or push content to the second device(s), illustrated as block 522. In this aspect, the key may not be required to connect to the sharing group. The first device transmits the content to any second device that is present and that has accepted the group invitation. This content may be transmitted using a traditional networking channel.

Once the second device has accepted the group invitation or connected to the sharing group, content may automatically be pushed to the second device. Thus, the second device does not necessarily have to perform any action to receive the content, the content may be received as part of group membership.

Figure 6:
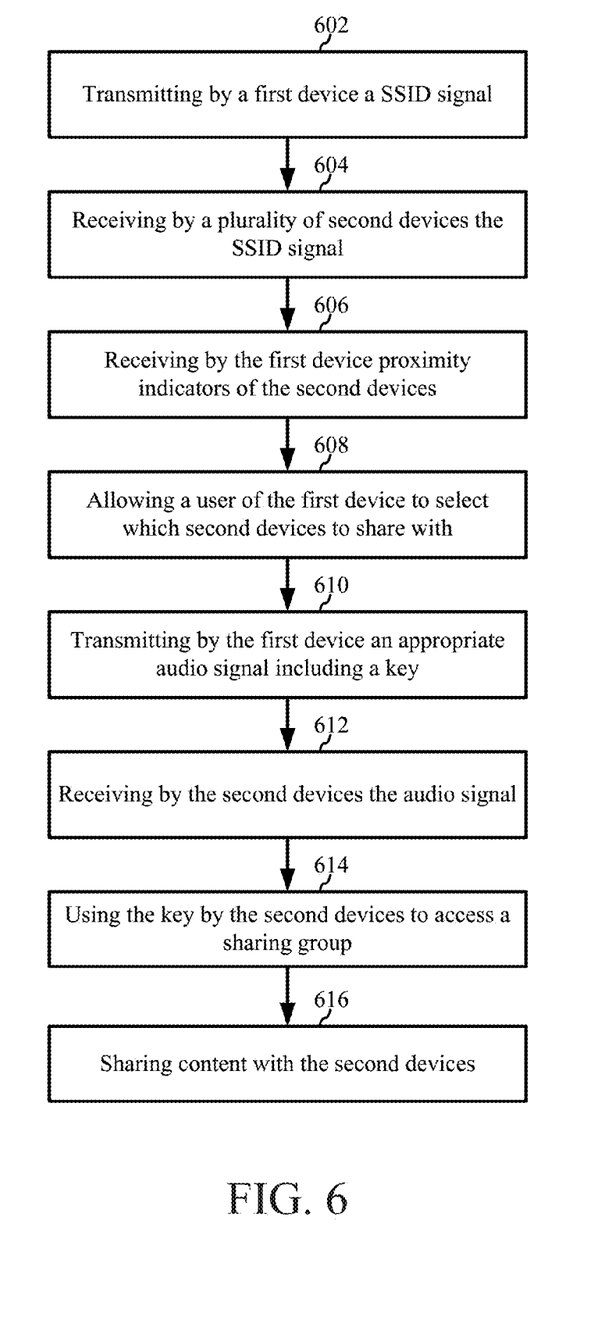
FIG. 6 is a flow diagram illustrating an exemplary routine for forming a sharing group according to aspects of the present disclosure.

In an aspect, the user of the first device may individually select the second devices or receiving devices allowed to connect to the sharing group. FIG. 6 is a flow diagram illustrating an exemplary method for forming a group. In this aspect, a group is initiated and the first device transmits an SSID signal, illustrated as block 602. The SSID signal is received by a plurality of second devices, illustrated as block 604. The second devices send, and the first device receives, a proximity indicator, such as a RF-fingerprint or other information relating to proximity, for each of the second devices, illustrated as block 606. This allows the first device to create a map-like representation of the proximity of the second devices to the first device. A user may then select the individual second devices the user desires to allow to connect to the sharing group, illustrated as block 608. The first device then transmits the appropriate audio signal containing the key, illustrated as block 610. The second devices listen for and receive the audio signal, illustrated as block 612. The second devices use the key to access the sharing group, illustrated as block 614. Once connected to the sharing group, the first device may then share content with the second devices, illustrated as block 616.

Figure 7:
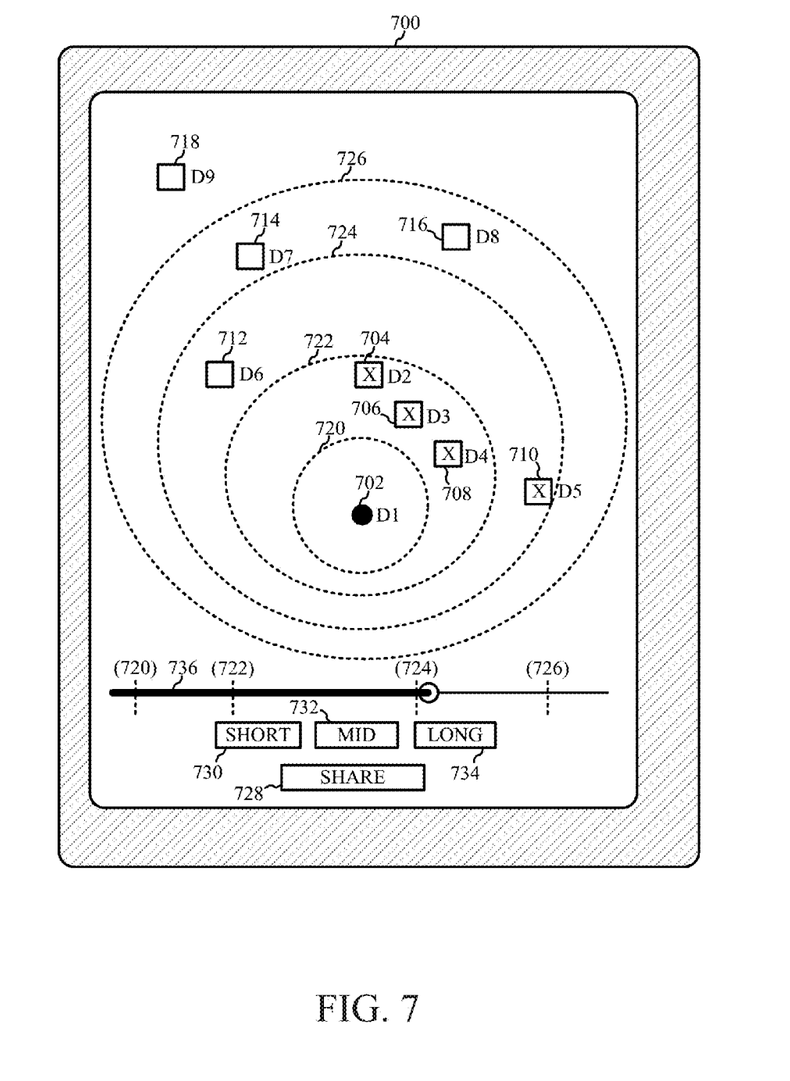
FIG. 7 illustrates an exemplary user interface for forming a sharing group according to aspects of the present disclosure.

FIG. 7 is an exemplary illustration of a user interface for forming a sharing group. A first device 700, which may be the same as device 102 and/or 200 described above, displays a map of the devices around the first device 700. In general, the first device 700 transmits the SSID signal and/or a request for proximity/location information. The signal is received by a plurality of devices in proximity to the first device. The receiving devices may send a RF-fingerprint, a received signal strength indication (RSSI), or other information relating to proximity/location to the first device to allow the first device to determine the relative proximity and/or location of the receiving devices. Information regarding such neighboring devices may also be sent in other ways. The location information of the neighboring devices allows the first device to create the map-like representation illustrated in FIG. 7. As illustrated, the first device 700 is represented as D1, 702, and additional devices are represented as D2-D9, 704-718 respectively. The devices may alternatively be represented in the user interface based on a corresponding IP address, email address, or the name of the corresponding device (i.e. John Smith's phone). The additional devices D2-D9, 704-718 respectively, are displayed in their general location with respect to the first device D1, 702.

Circular proximity range markings 720-726 illustrate a general group proximity range associated with varying strengths of an audio signal or other confirmation signal. This allows the user to identify which devices D2-D9, 704-718 respectively, would be able to hear the key transmitted via the audio signal at different levels of transmission power.

Due to the nature of audio waves, audio traveling in the air tends to attenuate. Additionally, high frequency audio waves tend to reflect off of and not penetrate boundaries, such as walls, and what does penetrate is rapidly attenuated. And any surfaces between the transmitting device and the receiving device, means that that signal will not reach the destination and the receiving device may not be able to reconstruct the key. By reducing the amplitude of the audio signal, content may be shared privately by whispering it very softly. The volume may be controlled enough that two devices would have to be ten to fifteen centimeters apart, or the attenuation in air eliminates the signal. This audio control allows the sharing device or user of the first device to effectively control how content is shared.

In an aspect, the user may select individual devices of devices D2-D9, 704-718 respectively, to allow access to the sharing group. As illustrated, devices D2-D5, 704-710 respectively, are selected. Thus, when the user activates the sharing function by selecting share 728, the first device 700 transmits an audio signal sufficient to allow devices D2-D5, 704-710 respectively, to hear the audio signal. The first device 700 may also prevent or block access to the sharing group by unselected devices (i.e. devices D6-D9, 712-718 respectively) even if any of these devices happen to be in range of the audio signal.

In another aspect, the user may simply select one of the pre-set group proximity range selections. For example, a short range selection 730, a mid-range selection 732, or a long range selection 734. Upon selection of one of the pre-set group proximity range selections, the user interface may display as selected the devices D2-D9, 704-718 respectively, that would be selected based on the pre-set group proximity range selected. For a more granular group proximity range selection, the user may increase or decrease the power of the audio signal by using slider bar 736. The slider bar 736 may also include proximity range markings corresponding to the power of the audio signal for each of the circular proximity range markings 720-726. As the power of the audio signal is increased, the first device displays as selected the devices D2-D9, 704-718 respectively, that would be selected based on the power. For example, as illustrated, the power of the slider bar 736 is close to the power level of circular proximity range marking 724, thereby allowing devices D2-D5 to be selected. Once the user is satisfied with the range of the audio signal, the user may activate the sharing function by selecting share 728. The user interface illustrated in FIG. 7 allows the user to customize the sharing group by selecting or de-selecting which of the devices that are allowed to access or connect to the sharing group.

In another aspect, a user of a first device may have a number of other electronic components or devices, such as a television, a stereo, a computer, etc., in his/her home. The user may desire to dynamically connect those devices to a sharing group depending on the user proximity to those devices. For example, the user may desire to listen to music and have the music follow him/her as he/she moves from room to room. For example, the first user and first device may be in the family room and the first device may communicate with a stereo or television in that room to share or stream music to that device. The use of the audio signal described above, allows a logically closest device, which may not be the true physically closest device (such as a device in another room on an opposite side of a wall) to be identified. The logically closest device is the device that should logically be connected to the sharing group. For example, the first user may be in a living room that includes a television. The television may not be the closest device to the first user based on actual distance, rather a computer on an opposite side of a wall in a room behind the first user may actually be closer to the user than the television. The first user would not want the computer to connect to the sharing group, since the computer is in a different room. Rather, the first user would want the television, which is in the same room as the first user, to connect to the sharing group. In this example, the television is the logically closest device since it is the device that should logically be connected to the sharing group based on the location of the first user.

As the user and first device move to a different room, the first device may dynamically adjust the sharing group and communicate with another device in that room to share or stream music to that device. These systems and methods can equally be applied to any situation in which access to content and data is desired to be limited to a location or proximity to a location or device.

Figure 8:
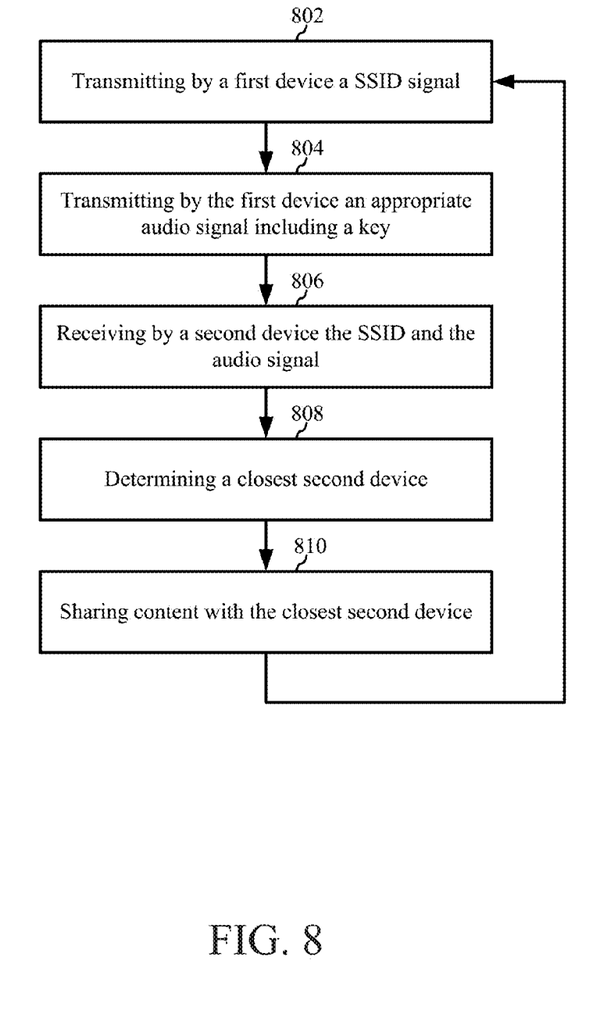
FIG. 8 is a flow diagram illustrating an exemplary routine for dynamic modification of a sharing group according to aspects of the present disclosure.

FIG. 8 is a flow diagram illustrating an exemplary method for dynamic modification of a group. A first device transmits an SSID signal, illustrated as block 802, and transmits an appropriate audio signal including a key, illustrated as block 804. A second device, such as a television, a stereo, a computer, etc., receives the SSID signal and the audio signal, illustrated as block 806. The first device determines a closest second device, illustrated as block 808. In an aspect, this may be done based on RF-fingerprint, RSSI, time of flight of the audio signal, or other technique for identifying proximity/location. Once the closest device is determined, the first device shares content with the closest second device, illustrated as block 810. The first device may be continuously transmitting the SSID signal and the audio signal, and determine the closest second device. As the first device moves, the device that the first device is sharing with may change because the closest second device may change.

For example, a user of the first device may be in a garage and playing music. When the user and first device move into the house, the music could follow the first device. In this aspect, the first device may be continuously broadcasting the presence of an interim group, and whichever second device joined most recently could be the one to become the playing device. The second devices in proximity to the first device is changing rapidly as the user and the first device move through the house, or an office at work, etc. The sharing group is dynamic based on proximity, and group membership is based on were in proximity or are in proximity.

Figure 9A:
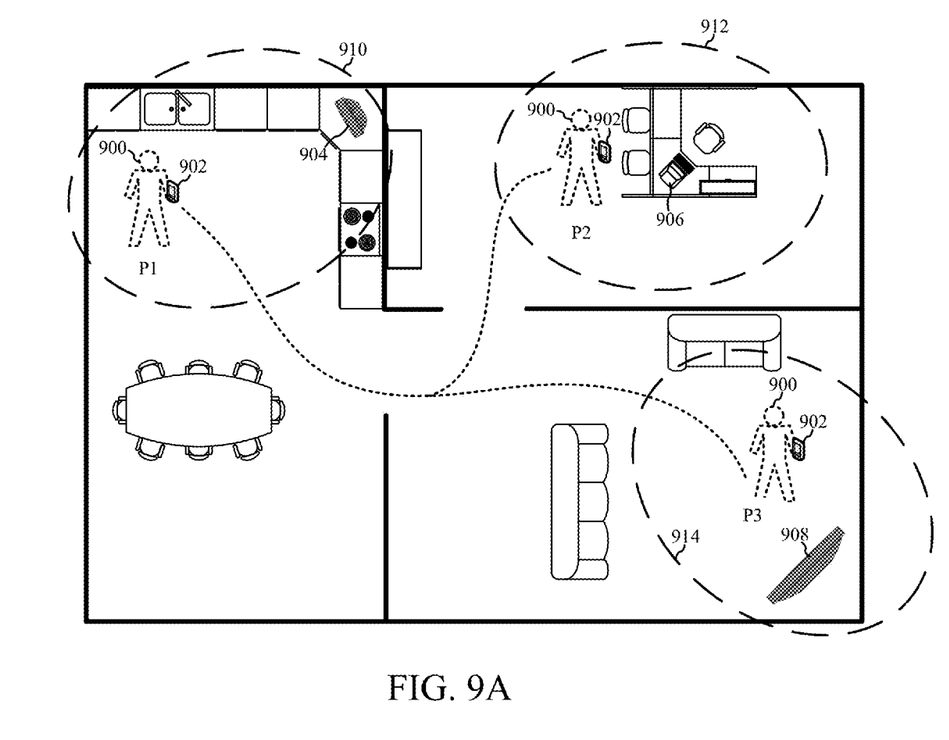
FIG. 9A illustrates an exemplary pictorial diagram of dynamic modification of a sharing group according to aspects of the present disclosure.
Figure 9B:
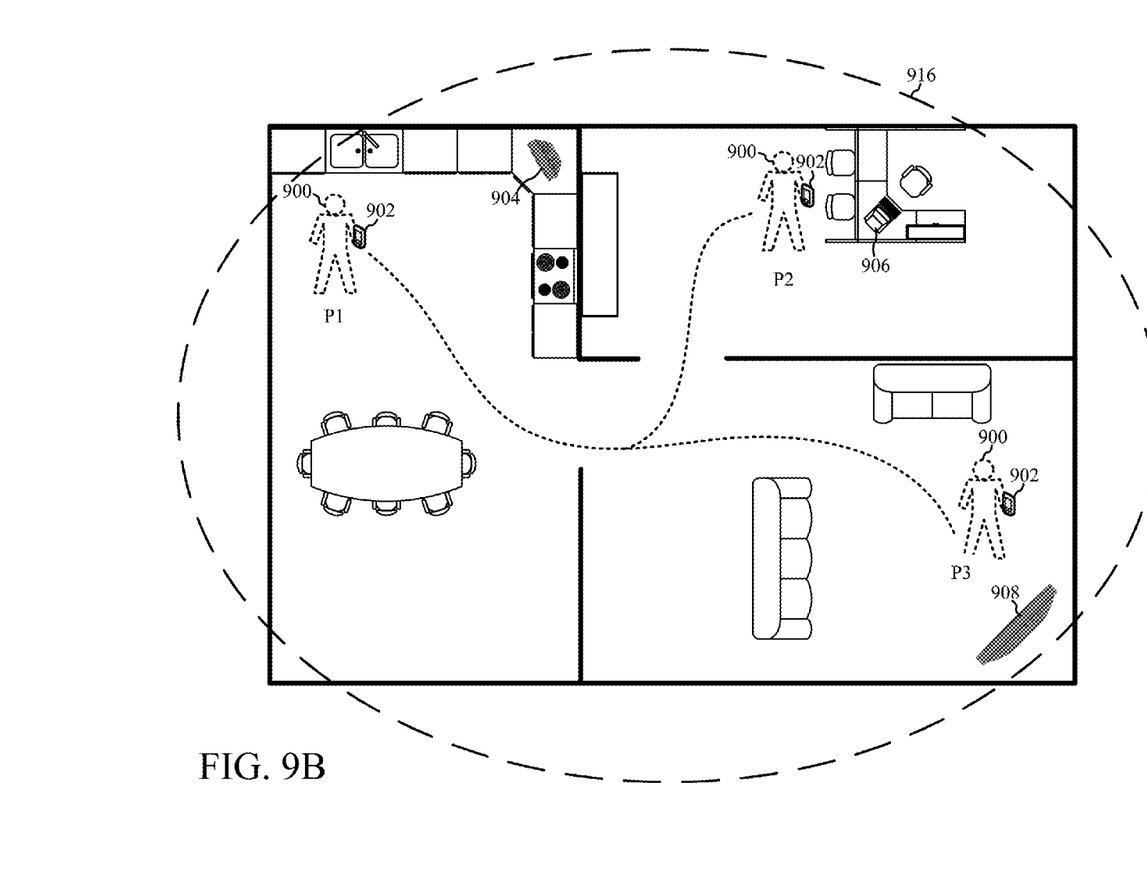
FIG. 9B illustrates another exemplary pictorial diagram of dynamic modification of a sharing group according to aspects of the present disclosure.

FIGS. 9A and 9B illustrate a pictorial diagrams of a user 900 of a first device 902 moving from one room to another. As illustrated, the user 900 of the first device 902 may be at a first location P1, such as in a kitchen. The first device 902 may initiate a first sharing group, illustrated in FIG. 9A as 910 and FIG. 9B as 916, with a television device 904 located in the kitchen, and share content, such as a movie or music with the television device 904.

As the user 900 and the first device 902 move to a different room, for example, to a second location P2, the closest device to the first device 902 changes. At the location P2, a computer device 906 is the closest device to the first device 902. Thus, the first device 902 may form a second sharing group, illustrated in FIG. 9A as 912, or the first device 902 may drop the television device 904 from the first sharing group and add the computer device 906 to the first sharing group, as illustrated in FIG. 9B, and share content with the computer device 906. Similarly, as the user 900 and the first device 902 move to yet another room, for example, to a third location P3, the closest device to the first device 902 is now television device 908. The first device 902 again may form a third sharing group, illustrated in FIG. 9A as 914, or the first device 902 may drop the computer device 906 from the first sharing group and add the television device 908 to the first sharing group, as illustrated in FIG. 9B, and share content with the television device 908.

The first device 902 may be continuously searching or polling for and measuring the proximity/location of devices within a sharing group, as illustrated in FIG. 9B, to determine whether a device is still in proximity or a new device is now the logically closest device to the first device 902. As the first device 902 moves and identifies another closest device, the first device 902 automatically drops a prior device that is no longer in close proximity from and adds the new closes device to the sharing group, or the first device 902 may form a new sharing group with the new closest device, as illustrated in FIG. 9A. This allows the user 900 to have a movie or music follow the user 900 as the user moves from room to room.

The systems and methods described above may be used in a wide variety of applications. For example, in an education setting detection of devices in physical proximity may be used to ensure that students are in the room while taking a test and/or to enforce that they are still present when moving between pages or questions. Similarly, the systems and methods may be used to ensure that confidential materials are only accessible while viewers are all in the same room, for example, when a device leaves a meeting, that device may lose access to the materials.

The systems and methods may be used for synchronized reading or viewing of content within a prescribed space. For example, in a classroom setting, rather than a teacher saying "turn to chapter 3," the teacher can push all devices in the room content to display a particular page. Automatic sharing of content annotations can be enabled to physically proximate users. This could be done as one-to-many, where a single person's notes are pushed out to the entire room, or many-to-many, where all of the peers' annotations may be viewed in real-time. This could also be used for collaborative composition and editing of content.

The systems and methods may be used for group formation. For example, if a user meets a new group of people for the first time, e.g. on the first day of school or during lunch at a conference, the user could easily exchange contact information with everyone who's sitting at a table. The systems and methods may also be used for passive attendance recording by detecting which devices are physically present within a room. This could also be used for tracking location history by keeping track of what things a device is proximate to as it moves through a building or other space.

Further examples of how the systems and methods may be used include: proximity-based advertising, and application level restriction of sharing content within a predefined or dynamic set of recipients (for example, a user may only want to share within a list of recipients that is based on some context, such as a list of recipients associated with a meeting invite).

As discussed above, the various embodiments may be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and protocols. Such a system also may include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of communication, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle, Microsoft, Sybase, and IBM.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad, or microphone), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system or device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer implemented method for sharing digital content, comprising:
    transmitting a wireless access signal including an identifier for a sharing group;
    receiving responses to the wireless access signal from a plurality of receiving devices, each response comprising location information of the respective receiving device;
    configuring a display to show a location of each of the plurality of receiving devices relative to a user device;
    allowing a selection of a proximity range, the proximity range encompassing at least one location of at least one of the plurality of receiving devices;
    selecting a first transmission strength for transmission of an audio signal, wherein the first transmission strength provides for transmission of the audio signal within the proximity range without transmission of the audio signal substantially beyond the proximity range;
    transmitting the audio signal, the audio signal including a security code for use in joining the sharing group;
    receiving, from at least one proximate device within the proximity range, an indication that the at least one proximate device has received the security code;
    joining the at least one proximate device to the sharing group;
    transmitting content to the at least one proximate device in response to the at least one proximate device joining the sharing group;
    monitoring a proximity of the at least one proximate device relative to the user device; and
    to remove the at least one proximate device from the sharing group in response to the proximity being located beyond a threshold distance from the user device.

2. The computer implemented method of claim 1, wherein the location information of the respective receiving device comprises a received signal strength indicator corresponding to a strength of the wireless access signal as received by the respective receiving device.

3. The computer implemented method of claim 1, wherein the location information of the respective receiving device comprises a radio frequency fingerprint corresponding to the respective receiving device.

4. The computer implemented method of claim 1, wherein the allowing the selection of the proximity range comprises allowing a selection of one or more receiving devices to be included in the sharing group and setting the proximity range to include locations of the one or more receiving devices.

5. A computing device comprising:
    at least one processor;
    a memory including instructions operable to be executed by the at least one processor to perform a set of actions, configuring the at least one processor:
        to cause display of location information of other devices relative to the computing device;
        to receive an indication of a proximity range within which at least a first device of the other devices may be invited to join a group;
        to transmit a first wireless signal, the first wireless signal comprising a group identifier;
        to transmit an audio signal, the audio signal comprising a group security code, wherein a transmission strength of the audio signal is configured based on the indicated proximity range;
        to receive an indication from the first device that the first device has received the group security code;
        to add the first device to the group;
        to monitor a proximity of the first device relative to the computing device; and
        to remove the first device from the group in response to the proximity of the first device being located beyond a threshold distance from the computing device.

6. The computing device of claim 5, wherein the audio signal is transmitted in a frequency range inaudible to humans.

7. The computing device of claim 5, wherein the at least one processor is configured to transmit content to the first device in response to the first device joining the group.

8. The computing device of claim 5, wherein the instructions further configure the at least one processor to receive content from the first device in response to the first device joining the group.

9. The computing device of claim 5, wherein the instructions further configure the at least one processor to receive an indicator of a location of the first device.

10. The computing device of claim 9, wherein the instructions further configuring the at least one processor to receive the indication of the proximity range comprise instructions to configure the at least one processor:
to receive an indication to join the first device to the group; and
to determine the proximity range based at least in part on the location of the first device relative to the computing device.

11. The computing device of claim 5, wherein the proximity range is selected from a plurality of predetermined proximity ranges.

12. The computing device of claim 5, wherein the instructions further configure the at least one processor:
to transmit a second wireless signal comprising the group security code; and
to remove the first device from the group in response to not receiving, within a threshold time, a confirmation from the first device that the first device has received the group security code.

13. The computing device of claim 5, wherein the first wireless signal is adapted to be transmitted over a first medium, and the audio signal is adapted to be transmitted over a second medium different from the first medium.

14. A computer implemented method comprising:
displaying in a user interface of a first computing device:
a proximity of one or more second devices relative to the first computing device,
a range selector, allowing a user to select devices within a range, and
a sharing selector, adapted to receive an instruction to share content with devices within the range;
transmitting an audio signal comprising a group security code in response to receiving the instruction to share, wherein a transmission strength of the audio signal is configured based on the range;
receiving an indication from at least one of the devices within the range that the at least one of the devices has received the group security code;
adding the at least one of the devices to a group;
monitoring a proximity of the at least one of the devices relative to the first computing device; and
removing the at least one of the devices from the group in response to the proximity of the at least one of the devices being located beyond a threshold distance from the first computing device.

15. The computer implemented method of claim 14, further comprising:
transmitting a first wireless signal;
receiving one or more response messages to the first wireless signal from the one or more second devices, each response message comprising proximity information of each respective second device, wherein the displaying the proximity of the one or more second devices in the user interface is based at least in part on the proximity information.

16. The computer implemented method of claim 14, wherein the range selector includes a slide bar adapted to increase or decrease the range.

17. The computer implemented method of claim 14, wherein the range selector includes at least one of a short range selection, a mid-range selection, and a long range selection.

18. The computer implemented method of claim 14, wherein the transmission strength of the audio signal is configured for transmission of the audio signal within the range without transmission of the audio signal substantially beyond the range.

* * * * *